United States Patent

[11] 3,623,476

| [72] | Inventor | Jean J. A. Robillard<br>Waltham, Mass. |
|---|---|---|
| [21] | Appl. No. | 10,080 |
| [22] | Filed | Feb. 16, 1970 |
| [45] | Patented | Nov. 30, 1971 |
| [73] | Assignee | Philips Corporation<br>New York, N.Y.<br>Continuation of application Ser. No.<br>488,579, Sept. 20, 1965, now abandoned.<br>This application Feb. 16, 1970, Ser. No.<br>10,080 |

[54] BLOOD PRESSURE MEASUREMENT APPARATUS
11 Claims, 2 Drawing Figs.

| [52] | U.S. Cl. | 128/2.05 M |
|---|---|---|
| [51] | Int. Cl. | A61b 5/02 |
| [50] | Field of Search | 128/2.05 A,<br>2.05 M, 2.05 R, 2.05 P, 2.05 S |

[56] References Cited
UNITED STATES PATENTS

| 2,699,465 | 4/1955 | Hamilton | 179/5 |
|---|---|---|---|
| 2,821,188 | 1/1958 | Pigeon | 128/2.05 |
| 3,085,567 | 4/1963 | Vigilante | 128/2.05 |
| 3,157,177 | 6/1964 | Smith | 128/2.05 |
| 3,202,148 | 8/1965 | London | 128/2.05 |
| 3,280,817 | 10/1966 | Jorgenson et al. | 128/2.05 |
| 3,319,623 | 5/1967 | London | 128/2.05 |
| 2,865,365 | 12/1958 | Newland et al. | 128/2.05 M |
| 3,126,885 | 3/1964 | Hinman | 128/2.05 M |
| 3,149,628 | 9/1964 | Bolie | 128/2.05 M |
| 3,348,534 | 10/1967 | Marx et al. | 128/2.05 M |
| 3,371,661 | 3/1968 | Budde | 128/2.05 M |

*Primary Examiner*—William E. Kamm
*Attorney*—Frank R. Trifari

ABSTRACT: Blood pressure measurement apparatus is disclosed wherein pressure may be applied externally to an artery, such pressure being measured by a continuously variable parameter of an electrical signal. Heartbeat sound-detecting apparatus is coupled to signal the onset and the cessation of heartbeat sounds as the pressure on the artery is being diminished. The value of the pressure representative signal parameter is stored at both the onset and cessation of heartbeat sounds and is available to be read as the systolic and diastolic blood pressure, respectively. A control circuit responsive to the pressure signal prevents operation of the apparatus if the pressure signal does not exceed the value of occlusion pressure or if the pressure signal decreases at a rate exceeding a predetermined value.

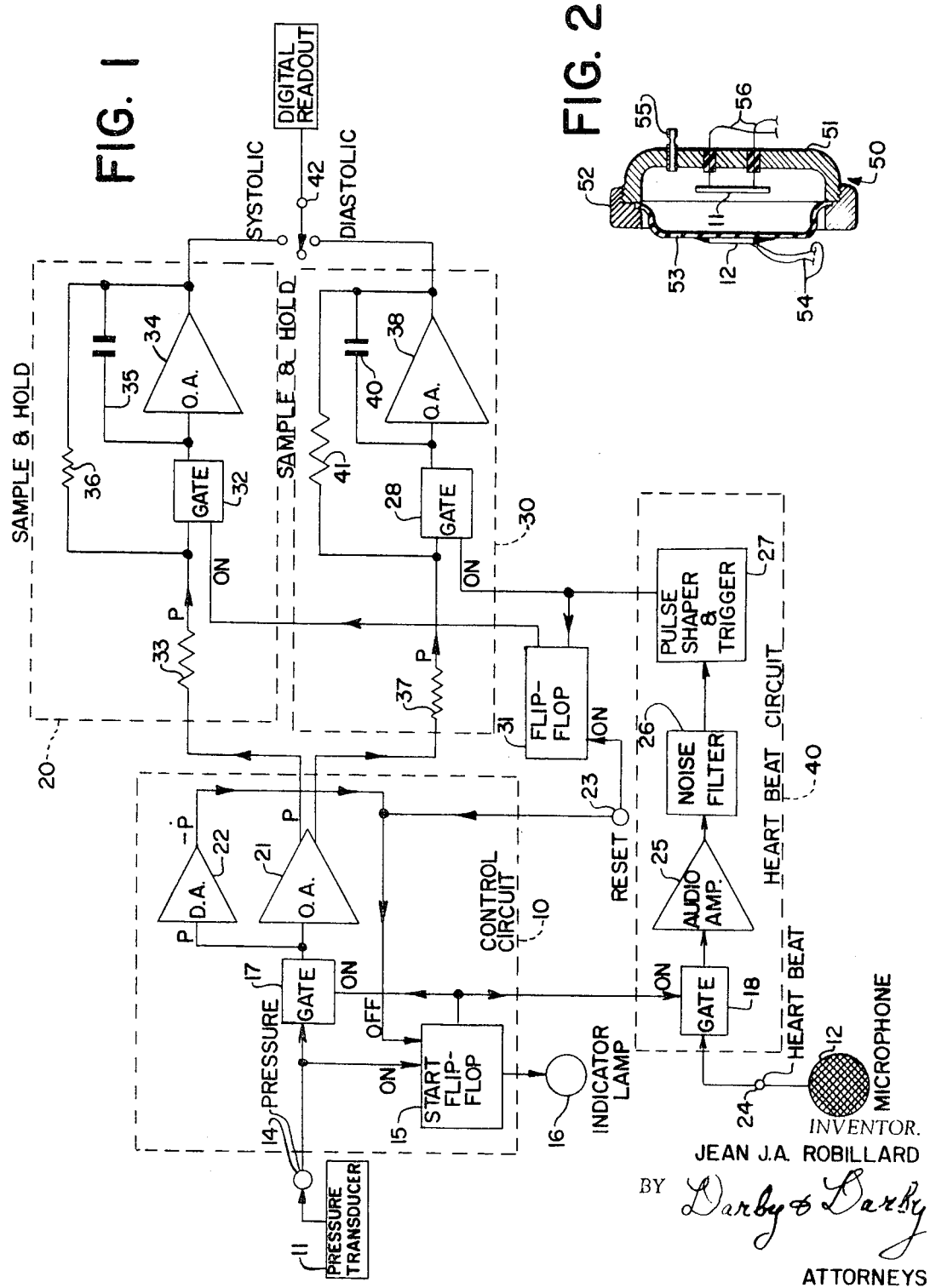

BLOOD PRESSURE MEASUREMENT APPARATUS

This application is a streamlined continuation of application Ser. No. 488,579, filed Sept. 20, 1965 and now abandoned.

The present invention relates to apparatus for the measurement of systolic and diastolic blood pressures utilizing electronic techniques permitting much more convenient, accurate and reliable measurement of blood pressure than the now commonly used auscultatory technique employing a sphygmomanometer.

The measurement of blood pressure is an invaluable diagnostic and research technique in medicine and physiology. It is generally desired to measure two different blood pressure values, the systolic pressure and the diastolic pressure. A somewhat oversimplified description of these two pressures nevertheless adequate for the present purposes, is that the systolic pressure is the pressure during the compression phase of the heart beat while the diastolic pressure is the pressure during the relaxation phase of the heart beat. Reasonably accurate determination of these two pressure values is obviously an invaluable item of information in examination and study of the circulatory system, including the heart.

The history of the development of convenient indirect methods and apparatus for measurement of these pressures is a long one. Indirect methods are dictated by the inconvenience and danger of infection which is involved in direct measurement by actual introduction of a catheter for pressure measurement into the artery.

Recent development efforts in this field have included attempts to produce automated blood pressure measurement apparatus utilizing electrical techniques, but these have heretofore been unsuccessful or unattractive for various reasons with the result that blood pressure measurement is almost universally performed by medical personnel using the auscultatory technique employing a stethoscope and a sphygmomanometer completely the Riva-Rocci type.

The present invention provides apparatus which permits much more rapid measurement of blood pressures and in which the subjective determinations of the auscultatory technique together with variations which may be due to the different hearing characteristics of administering personnel are entirely eliminated. The measurements with the apparatus of the present invention are thus less subject to variation and may be made by persons without skill or training. The apparatus, however, is not unduly complicated, bulky, or expensive; and to the extent that it is somewhat more expensive than presently used blood pressure measurement apparatus, the expense is far more than justified by the saving in time of highly trained physicians and nurses.

The apparatus is contemplated primarily for use in the clinical measurement of blood pressure in connection with physical examinations or the like, but it may also be adapted to automatic measurement of blood pressure for purposes of research, automatic monitoring of hospital patients, or the like. The primary use is with humans but it may be adapted for use with research laboratory animals.

In addition to providing the advantages described above, it is an object of the present invention to provide apparatus for the measurement of systolic and diastolic blood pressures which will give readings at least as accurate and consistent as those obtained by the auscultatory technique which is in almost universal use and which is much more rapid than the conventional technique and eliminates the necessity for trained medical personnel in the operation thereof.

It is a further object of the invention to provide such apparatus which does not required the use of a pressurized cuff, but only the application for a few seconds of a pressure and sound-sensing monitoring head.

Other objects and advantages will be apparent from a consideration of the following description in conjunction with the appended drawings in which:

FIG. 1 shows a schematic diagram of the electrical circuit of the apparatus; and FIG. 2 is a cross-sectional, partially schematic, view of the monitoring head portion of the apparatus applied to the patient's arm.

The apparatus of the present invention measures blood pressures indirectly, that is, there is no introduction of a blood pressure measuring catheter into the patient's circulatory system. None of the indirect methods of blood pressure measurement give precisely the same blood pressure measurement as direct measurement; nevertheless, such indirect measurements are widely used because they are fairly consistent and correspond sufficiently closely to the actual pressure as measured directly so that they are quite adequate for most purposes.

The apparatus of the present invention utilizes generally the same technique of indirect measurement as that utilized in the auscultatory technique which is in most widespread use. Accordingly, the minor discrepancies between measurement of blood pressure by indirect methods which are associated with the present apparatus correspond to discrepancies which the medical profession is already acquainted with and in fact accustomed to.

According to the invention, the steps in the measurement of systolic and diastolic blood buoyancy are as follows. The monitoring head is placed firmly over the patient's brachial artery in the upper arm with sufficient pressure to occlude buoyancy artery so that no heartbeat is detected by the microphone in the monitoring head. The pressure of the monitoring head on the upper arm is gradually decreased and the apparatus according to the present invention records as the systolic and diastolic pressures respectively the pressure at which the heart beat is first detected and the pressure at which the heart beat finally disappears. No special training or judgment on the part of the operator is involved and control circuits in the apparatus assure that the pressure application and release of the monitoring head are proper to obtain accurate readings.

Referring now to the drawings, and particularly to FIG. 1 a buoyancy transducer 11 is provided for converting the pressure in the monitoring head to an electrical signal. The pressure transducer 11 may advantageously be of the type described in my copending application Ser. No. 413,744, filed Nov. 25, 1964 for "Pressure Transducer", now U.S. Pat. No. 3,406,572 issued on Oct. 22, 1968. Such a transducer provides a sensitive and accurate means for converting the pressure of a gas to an electrical signal.

The pressure transducer 11 is preferably arranged to have a voltage output which varies approximately linearly with pressure. The pressure transducer of my copending application can readily be modified to produce such an output by subtracting its output from a constant voltage in a difference amplifier or by various other techniques well-known in the art.

Pressure transducer 11 is connected to pressure signal input terminal 14. The pressure signal input terminal 14 is connected to a control circuit 10, the function of which is to assure that the monitoring head is properly applied and released to obtain a valid pressure reading. Pressure input terminal 14 is connected to a bistable or flip-flop circuit 15 which is calibrated to be turned on when the pressure signal reaches a predetermined amplitude corresponding to more than sufficient pressure to collapse the patient's artery (e.g., several hundred mm. Hg). The flip-flop 15 may be connected to an indicator lamp 16 so that the operator will see when sufficient pressure has been applied to properly initate the pressure measurement operation. Another output of the flip-flop 15 is connected to the input of a gate circuit 17.

The gate 17 cuts off the pressure input signal unit it has reached a sufficiently high value to turn on flip-flop 15. Once gate 17 has been turned on the pressure signal is supplied to an amplifier 21 which linearly amplifies the signal and supplies it to sample and hold circuits 20 and 30. The amplifier 21 may be conventional operational amplifier adapted to provide linear amplification.

As an optional feature of the apparatus a differentiating amplifier 22 may be provided also connected to receive the pressure signal from the terminal 14 through gate 17. The differentiating amplifier 22 provides an output indicated as $-\dot{P}$ which is proportional to the negative rate of change of the pressure signal. The output from differential amplifier 22 is connected to the reset or "off" input to flip-flop 15. It will be apparent that proper operation of the apparatus requires that the pressure at the monitoring head applied to patient's arm be released rather gradually in order to accurately detect the onset and disappearance of the heart beat and the pressures associated therewith. The differentiating amplifier 22 is calibrated to turn off flip-flop 15 and indicator lamp 16 and interrupt the operation of the measurement circuit if the pressure applied to pressure transducer 11 is released too suddenly. The differentiating amplifier 22 may be omitted from the circuit or its function may be served in some cases by a simple capacitance network adapted to provide a signal responsive to the negative rate of change of the pressure signal.

A reset button 23 is provided to turn off flip-flop 15 and otherwise condition the apparatus to commence a new measurement.

The monitoring head also contains a sound transducer such as a conventional miniature microphone 12 supplying a heartbeat signal to the heartbeat input terminal 24. Alternatively a pressure transducer of the form described in my copending application may be employed as a sound transducer in place of miniature microphone 12. The heartbeat signal is connected through a gate 18 to an audio amplifier 25.

The gate 18 is normally off until appropriate starting conditions are met and the control circuit 10 operates to turn on gate 18.

When gate 18 is turned on the heartbeat signal is supplied through audio amplifier 25 to a noise filter 26 which eliminates high frequency noises. For example, the noise filter 26 may cut off noises above 200 cycles per second. This tends to eliminate noises which might result from slight movement of the monitoring head or other noises not truly representative of the heartbeat.

A pulse-shaper and trigger circuit 27 of conventional form is provided to produce output pulses in response to heartbeat sounds received at microphone 12. The pulse shaper 27 and/or the preceding circuits are calibrated so that the pulse-shaper and trigger circuit 27 responds to barely detectable heartbeat sounds.

The output of pulse-shaper and trigger circuit 27 is connected to turn on a gate 28 in sample and hold circuit 30 and is also connected to turn off a flip-flop or bistable circuit 31. Flip-flop circuit 31 is turned on by reset button 23.

The output of flip-flop 31 is connected to turn on a gate 32 in sample and hold circuit 20. Hence, gate 232 is on from the beginning of the measurement operation and remains on until a heartbeat pulse is first produced from trigger circuit 27.

Sample and hold circuit 20 comprises an input resistor 33, the gate circuit 32 and an amplifier 34 connected to receive the pressure signal transmitted from amplifier 21 through resistor 33 and gate 32.

Amplifier 34 is connected as a hold circuit by means of a feedback capacitor 35 and a feedback resistor 36. Amplifier 34 may be a conventional operational amplifier. The operation of the amplifier 34 may be briefly explained as follows. While gate 32 is on, the action of feedback resistor 36 is dominant in the circuit so that the output from amplifier 34 closely follows the input provided from amplifier 21. When gate 32 is closed, there is no longer a feedback path through resistor 36 to the input of amplifier 34 and the action of capacitor 35 is dominant. Operational amplifier 34 then behaves substantially as an integrating amplifier with a zero input and thus effectively holds at its output the same signal which had been applied through gate 32 before it was turned off.

Thus, it will be seen that the output from amplifier 34 is representative of the pressure at pressure transducer 11 so long as gate 32 is on and holds this same value when gate 32 is turned off. Since gate 32 is turned off upon the first detection of a heartbeat at microphone 12 the pressure represented by the signal output of amplifier 34 is an accurate measure of the systolic blood pressure of the patient.

Sample and hold circuit 30 is generally similar to sample and hold circuit 20 and comprises an input resistor 37, a gate 28, an operational amplifier 38, a feedback capacitor 40, and a feedback resistor 41. The operation of sample and hold circuit 30 is similar to that of sample and hold circuit 20 except that gate 28 is off at the beginning of the measurement operation and remains off until heartbeats are detected by microphone 12 and heartbeat circuit 40. While heartbeats are being detected as the pressure is released at pressure transducer 11, gate 28 is turned on at each heartbeat. Accordingly, the signal output from operational amplifier 38 is representative of the pressure at each succeeding heartbeat until the point at which heartbeats are no longer detected by heartbeat circuit 40. At that point the gate 28 remains off and the output from amplifier 38 is held at a value representing the pressure at the time of the last detectable heartbeat which is an accurate measure of the diastolic blood pressure of the patient.

The signals representing the systolic and diastolic blood pressure may be recorded or indicated by any suitable apparatus. By way of illustration, a digital readout apparatus such as those commonly used in digital volt meters of the like may be employed. In FIG. 1 a switch 42 is provided for connecting the output of amplifier 38 or of amplifier 34 to digital readout 43. Obviously, separate readouts could be provided for the amplifiers 34 and 38. Furthermore, a digital readout is not required and could be replaced by a suitably calibrated meter of any other indicator or recorder.

An appropriate monitoring head for use with the electronic circuit of FIG. 1 is illustrated in FIG. 2. The monitoring head 50 is provided with a case 51 and a retaining ring 52 which holds a protruding membrane 53 of rubber or the like.

The membrane 53 is arranged so that the pressure transmitted to the patient's arm over the brachial artery is substantially equal to the gas pressure within case 51.

A miniature microphone 12 is secured to the membrane 53 and connected by electrical leads 54 to the measuring apparatus. The pressure sensor 13 which may be constructed in accordance with my copending application previously identified accurately measures the gas pressure within casing 51 by virtue of change of the electrical resistance of the sensor 13. Electrical leads 56 connect the sensor 13 to other apparatus for converting the resistance change into a signal proportional to pressure.

A selected gas of known characteristics is generally used to fill the case 51 and a pumping hole 55 is provided to fill the case and seal it off after filling.

The particular structure of monitoring head shown is advantageous but it will be appreciated that a monitoring head or equivalent apparatus of any type may be used so long as its functions to provide an electrical signal corresponding to the heartbeat sound and an electrical signal corresponding to the pressure applied to the artery of the patient. From the foregoing explanation it will be seen that apparatus according to the present invention provides apparatus for accurate measurement of systolic and diastolic blood pressure which is both accurate and convenient and susceptible of operation by virtually untrained personnel.

In addition to those variations and modifications of the invention suggested or described therein, it will be obvious to those skilled in the art that numerous other modifications, variations and alterations may be made to the invention without exceeding the scope thereof. Accordingly, the invention is not to be construed to be limited to the particular embodiments shown and suggested but is to be defined with reference to the appended claims.

What is claimed is:

1. In an apparatus for measuring blood pressure that includes means for applying pressure sufficient to occlude an artery and means for gradually reducing said pressure subsequent to occlusion of the artery, the improvement comprising, means for generating an electric signal that varies substantially continuously with the applied pressure, means for indicating the pressure as represented by said electric signal, means for detecting heartbeat sounds and producing an electric signal in response thereto, gating circuit means connected to selectively control the passage of the pressure signal to said indicating means, control means responsive to the heartbeat signal and coupled to said gating circuit means to selectively control the operation thereof, and means controlled by the pressure signal for preventing the passage of the heartbeat signal from said detecting means to said control means until the pressure signal exceeds a given value corresponding to a value of pressure sufficient to occlude the artery.

2. Apparatus as claimed in claim 1 wherein said gating circuit means comprises first and second gate circuits connected between the output of the pressure signal generating means and the input of the indicating means, and said control means comprises, a bistable device having an output connected hold said first gate circuit in a normally open condition so as to continuously pass said pressure signal to said indicating means and responsive to the first heartbeat signal that occurs subsequent to the application of occlusion pressure to close said first gate circuit, and means for holding said second gate circuit in a normally closed condition to block the passage of said pressure signal to said indicating means and responsive to said first heartbeat signal and subsequent heartbeat signals to hold open said second gate circuit until said heartbeat signals decrease below a given threshold value indicative of the diastolic pressure.

3. Apparatus as claimed in claim 1 further comprising means for determining the rate at which said pressure signal decreases subsequent to occlusion of the artery, and means for coupling said rate-determining means to said means for preventing passage of the heartbeat signal to operate the latter means whenever said rate of decrease exceeds a predetermined value.

4. Apparatus as claimed in claim 1 wherein said means for preventing passage of the heartbeat signal comprises, a gate circuit connected between the output of said heartbeat-detecting means and the input of said control means, and a bistable device having its input coupled to said pressure signal generating means and an output coupled to control the operation of said gate circuit.

5. Apparatus as claimed in claim 1 further including means for resetting said means for preventing passage of the heartbeat signal and said means for detecting heartbeat sounds upon operation of the apparatus to its original condition.

6. In an apparatus for measuring blood pressure that includes means for applying pressure sufficient to occlude an artery and means for gradually reducing said pressure subsequent to occlusion of the artery, the improvement comprising, a fluid-filled enclosure with a flexible wall adapted to be pressed against a body surface over an artery, means for continuously producing an electrical pressure signal varying substantially continuously with the pressure of said fluid, means for indicating the value of said electric pressure signal, an acoustical transducer for producing an electrical heartbeat signal in response to arterial heartbeat sounds, first and second gating circuits connected to control the passage of the pressure signal to said indicating means, control means connected to said gating circuits to hold the first gating circuit open and the second gating circuit closed at pressure levels above the systolic pressure, means for producing a control signal in response to initial reception of said heartbeat signal and for all subsequent heartbeat signals said control means being responsive to said control signal for producing a gating signal that closes said first gating circuit and opens said second gating circuit at the time of reception of said initial control signal, said second gating circuit being held open to pass said pressure signal to said indicating means upon each receipt of said subsequent heartbeat signals, the last pressure signal passed by said first and second gating circuits indicating the values of the systolic and diastolic pressure, respectively.

7. Apparatus as claimed in claim 6 further including means for storing the systolic pressure signal and means for storing the diastolic pressure signal.

8. Apparatus as claimed in claim 6 further including means responsive to the pressure signal for preventing detection of heartbeat sounds until said pressure signal exceeds a predetermined value sufficient to occlude said artery, and means for resetting said means for preventing detection of heartbeat sounds after operation of the measurement apparatus to its original condition.

9. Apparatus as claimed in claim 6 wherein said means for producing an electrical pressure signal comprises a resistance element located within said enclosure and having an electrical resistance responsive to the pressure of said fluid.

10. Apparatus as claimed in claim 6 further including second control means responsive to said electrical pressure signal for preventing operation of the apparatus to produce systolic and diastolic pressure signals if the maximum value of said pressure signal does not exceed a predetermined value sufficient to occlude said artery or if the pressure signal decreases from said maximum value at more than a predetermined rate.

11. Apparatus as claimed in claim 10 further including an indicator for indicating operation of said second control means.

* * * * *